US012558682B2

(12) United States Patent
Chiyomaru et al.

(10) Patent No.: US 12,558,682 B2
(45) Date of Patent: Feb. 24, 2026

(54) SAMPLE ANALYSIS APPARATUS AND SAMPLE ANALYSIS METHOD

(71) Applicant: MITSUBISHI HEAVY INDUSTRIES, LTD., Tokyo (JP)

(72) Inventors: Masaru Chiyomaru, Tokyo (JP); Hiroaki Mikawa, Tokyo (JP); Yuuichi Okuzaki, Tokyo (JP); Masaru Takahashi, Tokyo (JP); Kohei Kawasaki, Tokyo (JP); Ayumi Hayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 940 days.

(21) Appl. No.: 17/828,404

(22) Filed: May 31, 2022

(65) Prior Publication Data

US 2023/0066692 A1 Mar. 2, 2023

(30) Foreign Application Priority Data

Aug. 31, 2021 (JP) ................................ 2021-141182

(51) Int. Cl.
*B01L 3/00* (2006.01)

(52) U.S. Cl.
CPC ......... *B01L 3/502* (2013.01); *B01L 2200/026* (2013.01); *B01L 2200/16* (2013.01); *B01L 2300/0663* (2013.01); *B01L 2400/0622* (2013.01)

(58) Field of Classification Search
CPC ............... B01L 3/502; B01L 2200/026; B01L 2200/16; B01L 2300/0663; B01L 2400/0622; C02F 1/008
See application file for complete search history.

(56) References Cited

U.S. PATENT DOCUMENTS

2010/0269579 A1* 10/2010 Lawrence ............ E21B 47/113 73/152.23

FOREIGN PATENT DOCUMENTS

JP H06-15279 A 1/1994

* cited by examiner

*Primary Examiner* — Samuel P Siefke
(74) *Attorney, Agent, or Firm* — HAUPTMAN HAM, LLP

(57) ABSTRACT

Provided is a sample analysis apparatus including: a syringe pump; a channel switch valve; a mixing container; a detection unit configured to detect a concentration of a specified substance contained in a sample solution; and a control unit configured to control the syringe pump and the channel switch valve. The channel switch valve includes a sample port, a reagent port, and a detection port connected to a detection pipe on which the detection unit is arranged. The control unit controls the syringe pump and the channel switch valve to draw the reagent solution from the reagent pipe to the mixing container, draw the sample solution from the sample pipe to the mixing container, draw the reagent solution from the reagent pipe to the mixing container, and supply a mixture solution containing the sample solution and the reagent solution from the mixing container to the detection unit.

8 Claims, 5 Drawing Sheets

SAMPLE ANALYSIS APPARATUS AND SAMPLE ANALYSIS METHOD

CROSS-REFERENCE TO RELATED APPLICATIONS

This application is based on Japanese Patent Application No. 2021-141182 filed on Aug. 31, 2021, the contents of which are incorporated herein by reference in its entirety.

BACKGROUND

1. Technical Field

The present disclosure relates to a sample analysis apparatus and a sample analysis method.

2. Description of Related Art

Devices that detect the concentration of a specified substance contained in a solution to be treated are conventionally known (see, for example, Japanese Patent Application Laid-Open No. H6-15279). Japanese Patent Application Laid-Open No. H6-15279 discloses a device including a concentration analyzer that detects the aluminum concentration in flue gas desulfurization drainage generated in a coal-fired power plant.

For example, when an aircraft component formed of a metal material such as an aluminum alloy is produced, surface treatment such as etching or coating treatment of a metal material is performed by using a treatment solution. To perform desired surface treatment by using a treatment solution, it is required to maintain the concentration of a specified substance contained in the treatment solution within a desired range.

Thus, for example, a sample solution is extracted from a treatment solution periodically (once a week or the like) by a worker or the like in a factory and transported to a location where an analysis apparatus is installed, and the concentration of the specified substance contained in the treatment solution is analyzed by using the analysis apparatus.

Since a certain period (for example, one week) elapses while a sample solution is extracted from a treatment solution in a factory, however, if the concentration of a specified substance contained in the treatment solution during this period significantly changes for some reason, it is not possible to maintain the concentration of the specified substance contained in the treatment solution within a desired range, and it may not be possible to perform suitable surface treatment.

Further, in analysis of a sample solution by using an analysis device, this requires an operation to mix a reagent solution with the sample solution, an operation to set a mixture solution, which is a mixture of the sample solution and a reagent solution, in the analysis device, and the like, and it is required to secure workers who perform these operations and a space where the analysis device is installed. In a factory, however, it is not easy to secure workers who perform various operations and a space where the analysis device is installed.

Further, if an analysis device that automatically mixes a sample solution and a reagent solution and detects the concentration of a specified substance contained in the sample solution can be installed in a factory, it will be possible to increase the frequency of analyzing the sample solution and maintain the concentration of the specified substance contained in a treatment solution within a desired range. However, if it is not possible to sufficiently mix a sample solution and a reagent solution, it will not be possible to accurately analyze the concentration of the specified substance contained in the sample solution.

BRIEF SUMMARY

The present disclosure has been made in view of such circumstances and intends to provide a sample analysis apparatus and a sample analysis method that enable suitable analysis so as to maintain the concentration of a specified substance contained in a treatment solution within a desired range without securing a worker who performs operations or a space for the operations of mixing a reagent solution to a sample solution extracted from the treatment solution used for surface treatment of a metal material.

A sample analysis apparatus according to an aspect of the present disclosure is a sample analysis apparatus comprising: a pump arranged on a main pipe; a channel switch unit having a main port connected to the main pipe and a plurality of sub-ports and configured to select one of the sub-ports that is connected to the main port; a mixing container provided on the main pipe between the pump and the main port; a detection unit configured to detect a concentration of a specified substance contained in a sample solution extracted from a treatment solution used for surface treatment of a metal material; and a control unit configured to control the pump and the channel switch unit, wherein the plurality of sub-ports include a sample port connected to a sample pipe supplied with the sample solution, a reagent port connected to a reagent pipe supplied with a reagent solution, and a detection port connected to a detection pipe on which the detection unit is arranged, and wherein the control unit is configured to control the pump and the channel switch unit so as to connect the reagent port to the main port to draw the reagent solution from the reagent pipe to the mixing container, connect the sample port to the main port to draw the sample solution from the sample pipe to the mixing container, re-connect the reagent port to the main port to draw the reagent solution from the reagent pipe to the mixing container, and connect the detection port to the main port to supply a mixture solution containing the sample solution and the reagent solution from the mixing container to the detection unit.

A sample analysis method according to an aspect of the present disclosure is a sample analysis method of using a sample analysis apparatus to determine a concentration of a specified substance contained in a sample solution, wherein the sample analysis apparatus comprises a pump arranged on a main pipe, a channel switch unit having a main port connected to the main pipe and a plurality of sub-ports and configured to select one of the sub-ports that is connected to the main port, a mixing container provided on the main pipe between the pump and the main port, and a detection unit configured to detect a concentration of the specified substance contained in a sample solution extracted from a treatment solution used for surface treatment of a metal material, wherein the plurality of sub-ports include a sample port connected to a sample pipe supplied with the sample solution, a reagent port connected to a reagent pipe supplied with a reagent solution, and a detection port connected to a detection pipe on which the detection unit is arranged, the sample analysis method comprising: a control step of controlling the pump and the channel switch unit so as to connect the reagent port to the main port to draw the reagent solution from the reagent pipe to the mixing container, connect the sample port to the main port to draw the sample solution from the sample pipe to the mixing container, re-connect the reagent port to the main port to draw the reagent solution from the reagent pipe to the mixing container, and connect the detection port to the main port to supply a mixture solution containing the sample solution and the reagent solution from the mixing container to the detection unit; and a detection step of determining a concentration of the specified substance contained in the mixture solution by using the detection unit.

According to the present disclosure, it is possible to provide a sample analysis apparatus and a sample analysis method that enable suitable analysis so as to maintain the concentration of a specified substance contained in a treatment solution within a desired range without securing a worker who performs operations or a space for the operations of mixing a reagent solution to a sample solution extracted from the treatment solution used for surface treatment of a metal material.

DETAILED DESCRIPTION

Figure 1:
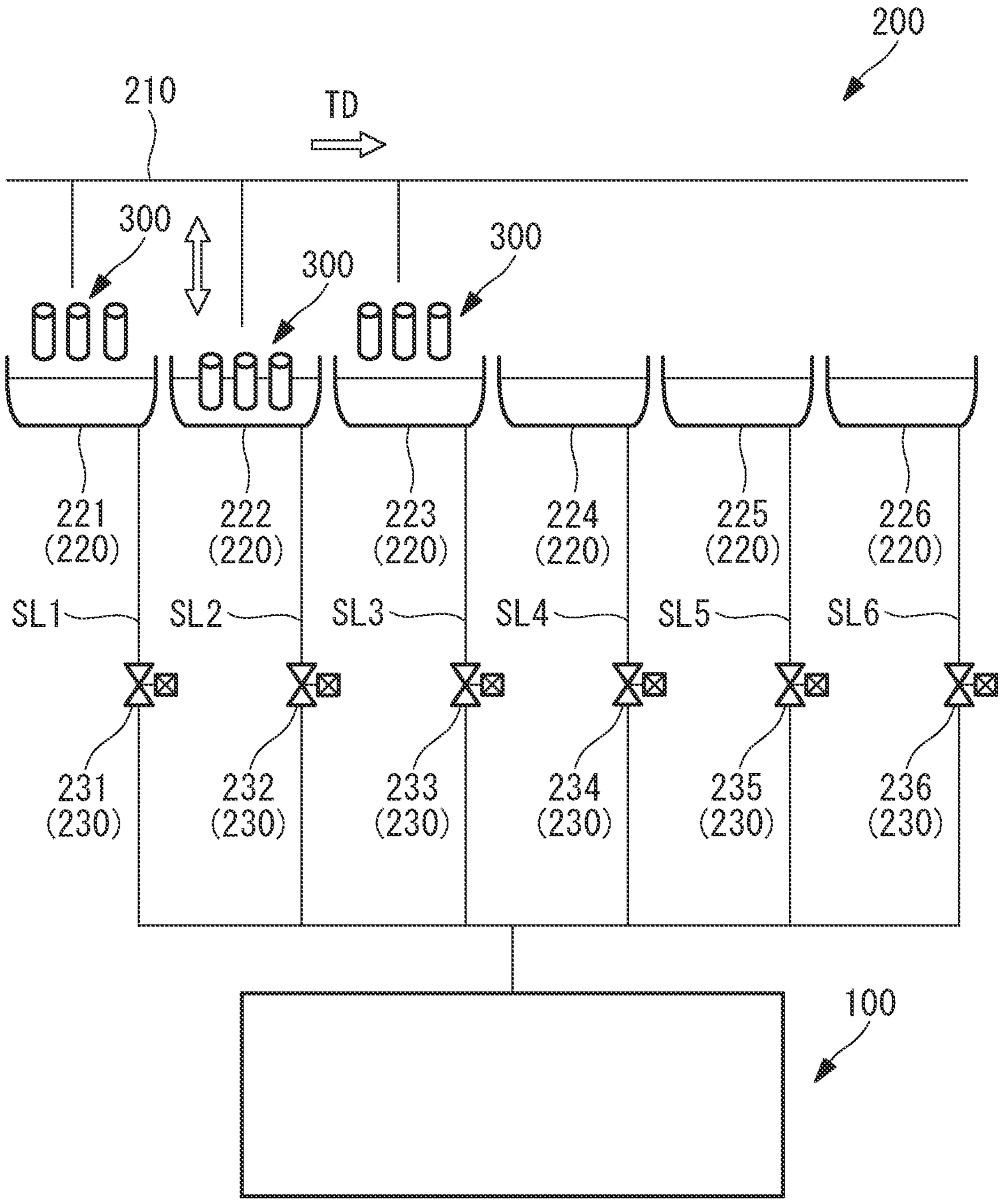
FIG. 1 is a schematic configuration diagram illustrating a sample analysis system.

A sample analysis system according to one aspect of the present disclosure will be described below with reference to the drawings. FIG. 1 is a schematic diagram illustrating the sample analysis system of the present disclosure. As illustrated in FIG. 1, the sample analysis system has a sample analysis apparatus 100 and a surface treatment apparatus 200. The detailed configuration of the sample analysis apparatus 100 will be described later.

The surface treatment apparatus 200 is an apparatus that performs surface treatment on metal components 300 formed of a metal material. The metal component (target component) 300 is an aircraft component formed of an aluminum alloy, for example. The surface treatment apparatus 200 has a crane 210, a plurality of treatment baths 220 spaced apart from each other in a transport direction TD, and a plurality of valves 230 provided in association with respective treatment baths 220.

The surface treatment apparatus 200 is an apparatus that performs anodizing treatment (aluminum anodic oxidation treatment) for forming a coating on the surface of an aircraft component formed of an aluminum alloy, for example. As a treatment solution used for anodizing treatment, chromic acid, sulfuric acid, phosphoric acid, and boric acid and sulfuric acid may be used, for example.

A treatment solution used for anodizing treatment is retained in a first treatment bath 221 included in the plurality of treatment baths 220. Pure water is retained in a second treatment bath 222 and a third treatment bath 223. The surface treatment apparatus 200 hangs and vertically moves the metal component 300 by the crane 210 to immerse the metal component 300 in the treatment solutions retained in respective treatment baths in the order of the first treatment bath 221, the second treatment bath 222, and the third treatment bath 223 while moving the metal component 300 in the transport direction TD.

Further, treatment solutions used for other surface treatment are retained in a fourth treatment bath 224, a fifth treatment bath 225, and a sixth treatment bath 226, respectively. The surface treatment apparatus 200 immerses the metal component 300 in the treatment solutions sequentially in the order of first to sixth treatment baths in the transport direction TD and thereby performs desired surface treatment on the metal component 300. Note that any number of treatment baths 220 can be included in the surface treatment apparatus 200.

As illustrated in FIG. 1, the first treatment bath 221, the second treatment bath 222, the third treatment bath 223, the fourth treatment bath 224, the fifth treatment bath 225, and the sixth treatment bath 226 are connected to a first pipe SL1, a second pipe SL2, a third pipe SL3, a fourth pipe SL4, a fifth pipe SL5, and a sixth pipe SL6, respectively, which guide the sample solution extracted from the treatment solution to the sample analysis apparatus 100.

The first pipe SL1, the second pipe SL2, the third pipe SL3, the fourth pipe SL4, the fifth pipe SL5, and the sixth pipe SL6 are provided with a first valve 231, a second valve 232, a third valve 233, a fourth valve 234, a fifth valve 235, and a sixth valve 236, respectively. A control unit 60 of the sample analysis apparatus 100 can extract a treatment solution in any treatment bath of the plurality of treatment baths 220 to supply the treatment solution to the sample analysis apparatus 100 by switching the open/shut state of the plurality of valves 230 (first to sixth valves).

Figure 2:
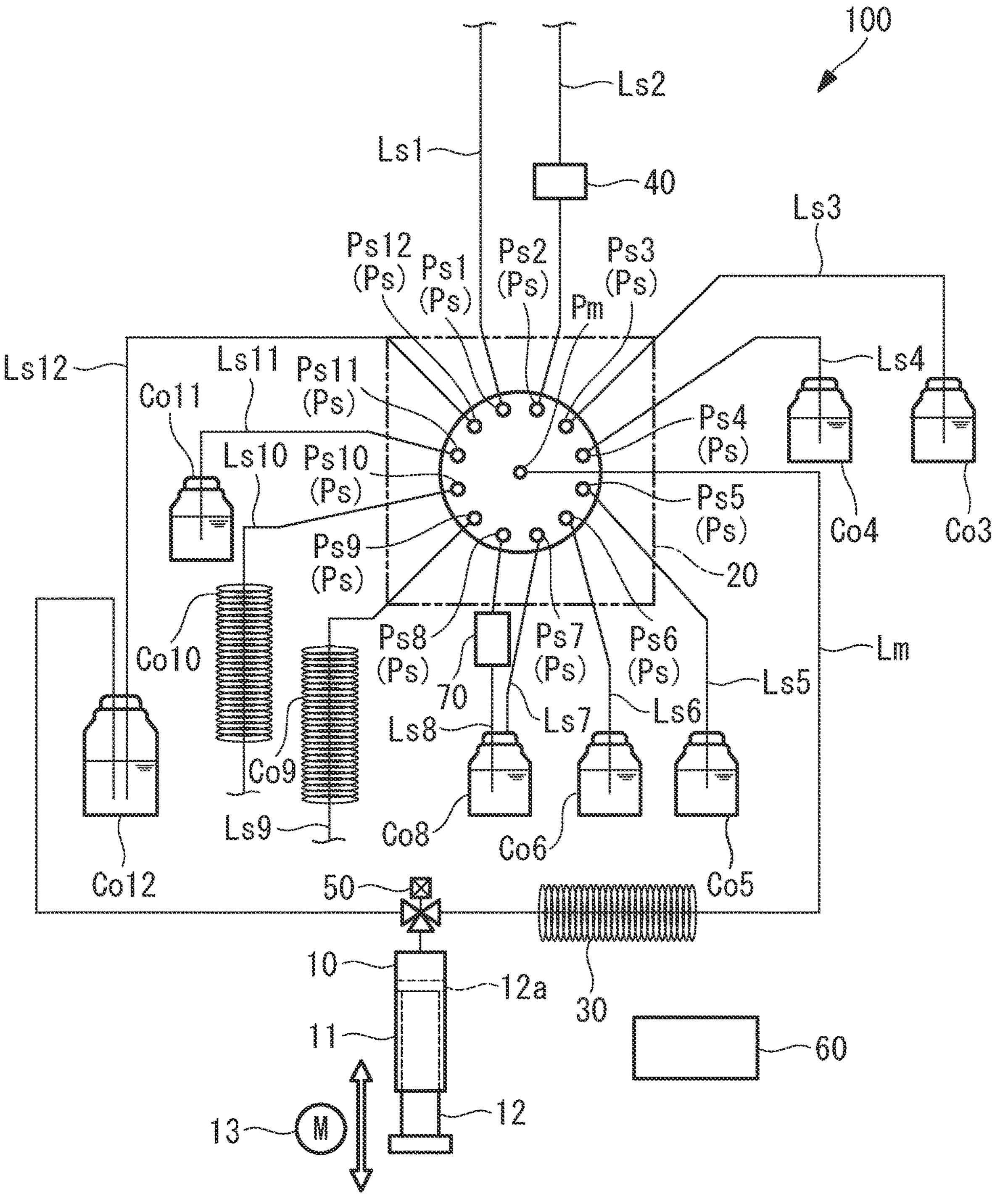
FIG. 2 is a diagram illustrating a general configuration of a sample analysis apparatus.

Next, details of the sample analysis apparatus 100 of the present embodiment will be described with reference to FIG. 2. FIG. 2 is a diagram illustrating a general configuration of the sample analysis apparatus 100. As illustrated in FIG. 2, the sample analysis apparatus 100 includes a syringe pump 10, a channel switch valve (channel switch unit) 20, a mixing container 30, a detection unit 40, a three-way valve 50, the control unit 60, and a removal unit 70.

The syringe pump 10 is a device arranged on a main pipe Lm and configured to suck or deliver a predetermined amount of liquid. A gasket 12*a* in contact with the inner circumferential surface of an outer cylinder 11 is attached to the end of the plunger 12, the length of the plunger 12 inserted in the outer cylinder 11 is adjusted by the motor 13, and thereby the syringe pump 10 adjusts an amount of suction and an amount of delivery of a liquid.

The channel switch valve 20 is a device having a main port Pm and a plurality of sub-ports Ps (Ps1 to Ps12) and configured to select a sub-port Ps connected to the main port Pm. The main port Pm and the sub-port Ps are channels used for flow of a liquid. The channel switch valve 20 performs switching to connect any one of the plurality of sub-ports Ps (Ps1 to Ps12) to the main port Pm in accordance with a control signal transferred from the control unit 60.

A sample port Ps1 is a port connected to a sample pipe Ls1 supplied with a sample solution extracted from a treatment solution retained in any of the plurality of treatment baths 220. A detection port Ps2 is a port connected to a detection pipe Ls2 on which the detection unit 40 is arranged. A reaction reagent port Ps1 is a port connected to a reaction reagent pipe Ls3 supplied with a reaction reagent solution from a reaction reagent container Co3. For example, the reaction reagent solution is provided by adding 1 mL of concentrated nitric acid to about 70 mL of water, dissolving 12.2 g of anhydrous magnesium sulfate (25 g in a case of heptahydrate), 5 g of ascorbic acid, and 0.25 g of o-phenanthroline monohydrate, adding 5 mL of 10 ppm aluminum standard solution to the mixture solution, and adding water to have a total volume of 100 mL.

A coloring reagent port Ps4 is a port connected to a coloring reagent pipe Ls4 supplied with a coloring reagent solution (for example, a pyrocatechol violet (PCV) solution) from a coloring reagent container Co4. A buffer solution port Ps5 is a port connected to a buffer solution pipe Ls5 supplied with a buffer solution (for example, a hexamine solution) from a buffer solution container Co5. A hexavalent chromium removal cartridge cleaning port Ps6 is a port connected to a cleaning pipe Ls6 supplied with 0.1 M of NaOH that is a cleaning solution from a cleaning container Co6. The cleaning solution retained in the cleaning container Co6 is supplied to the removal unit 70, and thereby the removal unit 70 can be cleaned up.

A removal port Ps8 is a port connected to a removal pipe Ls8 provided with the removal unit 70. A return port Ps7 is a port connected to a return pipe Ls7 supplied with a reagent solution retained in a reagent solution container Co8. A first dilution port Ps9 is a port connected to a first dilution pipe Ls9 supplied with a sample solution diluted with pure water. A second dilution port Ps10 is a port connected to a second dilution pipe Ls10 supplied with a sample solution diluted with pure water.

A reference port Ps11 is a port connected to a reference pipe Ls11 supplied with a reference solution containing a known concentration (predetermined concentration) of aluminum ions from a reference solution container Co11. A pure water port Ps12 is a port connected to a pure water pipe Ls12 supplied with pure water from a pure water container Co12.

The mixing container 30 is a looped (coiled) container provided on the main pipe Lm between the syringe pump 10 and the main port Pm. When the control unit 60 controls the three-way valve 50 to connect the main pipe Lm on the mixing container 30 side to the syringe pump 10, a liquid is sucked from the main port Pm to the mixing container 30 or a liquid is delivered from the mixing container 30 to the main port Pm in accordance with the operation of the syringe pump 10.

The detection unit 40 is a device that detects the concentration of aluminum ions (specified substance) contained in a sample solution extracted from a treatment solution used for a surface treatment of an aluminum alloy. The detection unit 40 detects the aluminum ion concentration by measuring the amount of light transmitting when irradiating a mixture solution that is a mixture of a sample solution and a reagent solution with light of a particular wavelength.

Note that, although the detection unit detects the aluminum ion concentration in the present embodiment, other forms may be employed. For example, a concentration of another specified substance such as silica ions may be detected.

The three-way valve 50 is a device that performs switching between a first state where the mixing container 30 side of the main pipe Lm is connected to the syringe pump 10 and a second state where the pure water container Co12 side of the main pipe Lm is connected to the syringe pump 10. An operation to suck the liquid by the syringe pump 10 in the first state causes the liquid to be guided from the main port Pm to the mixing container 30. An operation to suck the liquid by the syringe pump 10 in the second state causes the pure water to be guided from the pure water container Co12 to the syringe pump 10.

Figure 3:
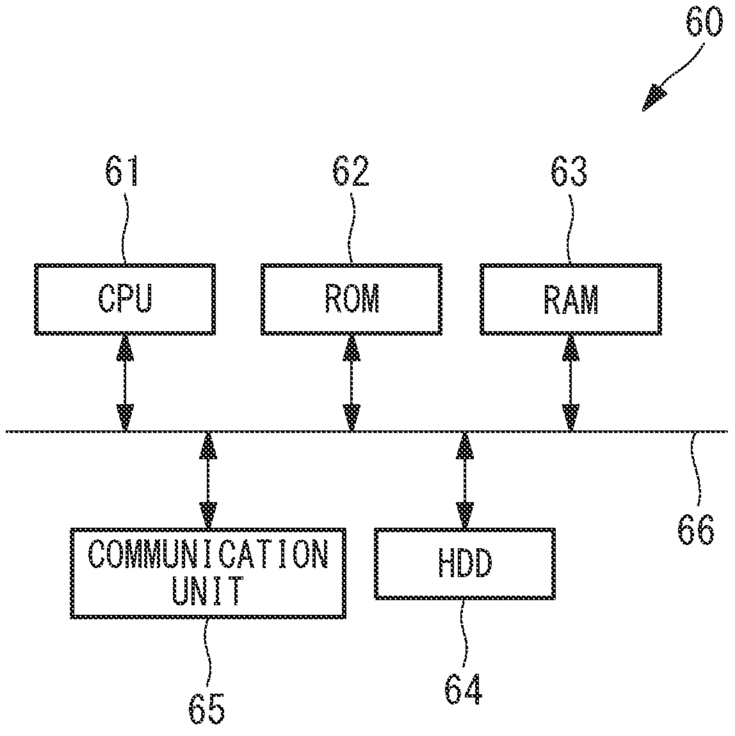
FIG. 3 is a block diagram illustrating a configuration of a control unit illustrated in FIG. 2.

The control unit 60 is a device that controls the overall sample analysis apparatus 100 including the syringe pump 10, the channel switch valve 20, and the three-way valve 50. As illustrated in FIG. 3, the control unit 60 is a computer system (calculator system) and includes a CPU 61, a read only memory (ROM) 62 for storage of a program or the like executed by the CPU 61, a random access memory (RAM) 63 functioning as a work area during execution of each program, a hard disk drive (HDD) 64 as a mass storage device, and a communication unit 65 for connection to a network or the like. These units are connected to each other via a bus 66.

The removal unit 70 is a device for removing a removal target substance contained in a sample solution. The removal target substance of the present embodiment is chromate ion (hexavalent chromium). When chromic acid is used as a treatment solution used for anodizing treatment, chromate ions are contained in the treatment solution. If chromate ions remain in a sample solution, a correct detection result is not obtained when a mixed solution in which a sample solution and a reagent solution are mixed is detected by the detection unit 40.

Accordingly, chromate ions are removed by the removal unit 70. The removal unit 70 has an anion exchange resin cartridge and removes chromate ions from a sample solution passing through the removal unit 70. The sample solution after chromate ions have been removed is supplied to the reagent solution container Co8 via the removal pipe Ls8.

Figure 4:
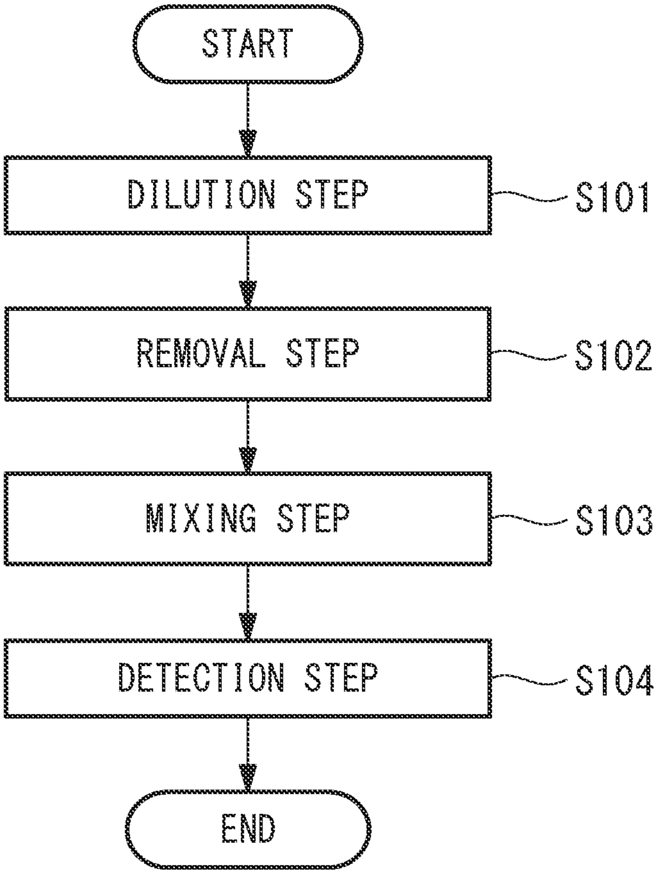
FIG. 4 is a flowchart illustrating a sample analysis method of the present embodiment.
Figure 5:
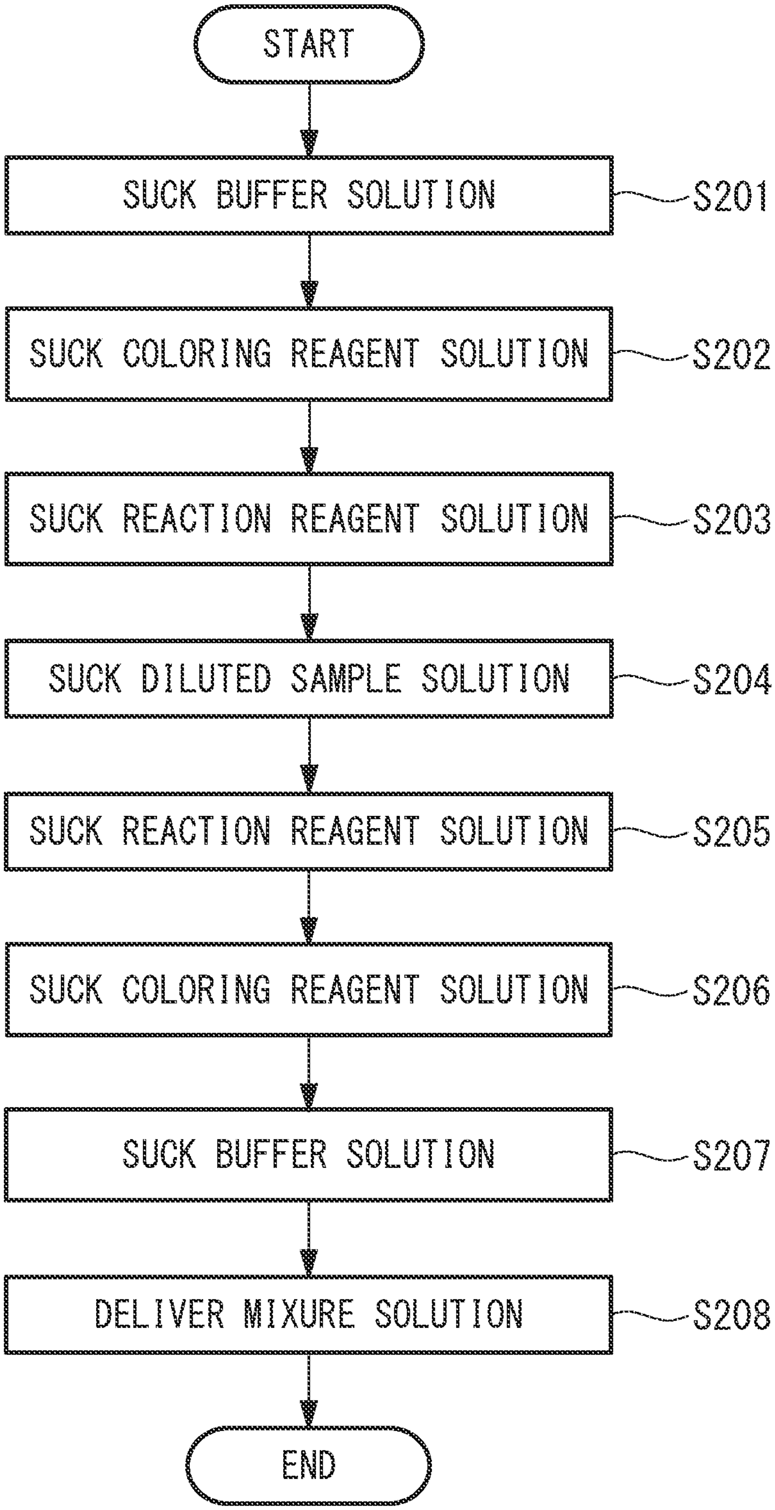
FIG. 5 is a flowchart illustrating a mixing step of FIG. 4.

Next, a sample analysis method using the sample analysis apparatus 100 of the present embodiment will be described with reference to a flowchart illustrated in FIG. 4 and FIG. 5. FIG. 4 is a flowchart illustrating a sample analysis method of the present embodiment. FIG. 5 is a flowchart illustrating a mixing step of FIG. 4. Each process illustrated in FIG. 4 and FIG. 5 is performed when the control unit 60 operates a control program. Note that, unless otherwise specified below, the control unit 60 controls the three-way valve 50 into the first state where the mixing container 30 side of the main pipe Lm is connected to the syringe pump 10.

In step S101, the control unit 60 mixes a sample solution with pure water to produce a diluted solution (dilution step). The control unit 60 controls the channel switch valve 20 to connect the sample port Ps1 to the main port Pm. Further, the control unit 60 controls the syringe pump 10 to draw a sample solution from the sample pipe Ls1 to the mixing container 30. Accordingly, a predetermined amount of the sample solution is retained in the mixing container 30.

Next, the control unit 60 controls the channel switch valve 20 to connect the pure water port Ps12 to the main port Pm. Further, the control unit 60 controls the syringe pump 10 to draw pure water from the pure water pipe Ls12 to the mixing container 30. Accordingly, a predetermined amount of the sample solution and a predetermined amount of pure water are retained in the mixing container 30.

Next, the control unit 60 controls the channel switch valve 20 to connect the first dilution port Ps9 to the main port Pm. Further, the control unit 60 controls the syringe pump 10 to supply the diluted solution from the mixing container 30 to a first diluting container Co9 connected to the first dilution pipe Ls9. Accordingly, the diluted solution is retained in the first diluting container Co9.

The control unit 60 performs the following process when further diluting, with pure water, the diluted solution retained in the first diluting container Co9. Specifically, the control unit 60 controls the channel switch valve 20 to connect the first dilution port Ps9 to the main port Pm. Further, the control unit 60 controls the syringe pump 10 to draw the diluted solution from the first dilution pipe Ls9 to the mixing container 30. Accordingly, a predetermined amount of the diluted solution is retained in the mixing container 30.

Next, the control unit 60 controls the channel switch valve 20 to connect the pure water port Ps12 to the main port Pm. Further, the control unit 60 controls the syringe pump 10 to draw pure water from the pure water pipe Ls12 to the mixing container 30. Accordingly, a predetermined amount of the diluted solution and a predetermined amount of pure water are retained in the mixing container 30.

Next, the control unit 60 controls the channel switch valve 20 to connect the second dilution port Ps10 to the main port Pm. Further, the control unit 60 controls the syringe pump 10 to supply the diluted solution from the mixing container 30 to a second diluting container Co10 connected to the second dilution pipe Ls10.

Accordingly, the diluted solution is retained in the second diluting container Co10. After diluted by using the first diluting container Cog, the sample solution can be further diluted by using the second diluting container Co10. It is therefore possible to dilute a sample solution over a wide range of ratios so as to have a desired diluted solution suitable for detecting the sample solution at the detection unit 40.

Note that, when there is no need for diluting a sample solution extracted from the plurality of treatment baths 220, the dilution step of step S101 may be omitted. If the dilution step is omitted, the sample solution sucked from the sample pipe Ls1 to the mixing container 30 is delivered to the removal unit 70 in the removal step of step S102.

In step S102, the control unit 60 removes a removal target substance contained in the diluted solution by using the removal unit 70 (removal step). The control unit 60 controls the channel switch valve 20 to connect the first dilution port Ps9 or the second dilution port Ps10 to the main port Pm. Further, the control unit 60 controls the syringe pump 10 to draw the diluted solution from the first dilution pipe Ls9 or the second dilution pipe Ls10 to the mixing container 30. Accordingly, a predetermined amount of the diluted solution is retained in the mixing container 30.

Next, the control unit 60 controls the channel switch valve 20 to connect the removal port Ps8 to the main port Pm. Further, the control unit 60 controls the syringe pump 10 to supply the diluted solution from the mixing container 30 to the removal unit 70 arranged on the removal pipe Ls8. The removal unit 70 removes chromate ions from the diluted solution passing through the removal unit 70 and supplies the diluted solution to the reagent solution container Co8 via the removal pipe Ls8.

In step S103, the control unit 60 mixes a reaction reagent and a coloring reagent to the diluted solution (reagent solution) and delivers the mixture to the detection unit 40 (mixing step). The mixture step of step S103 includes a series of treatment from step S201 to step S208 of FIG. 5.

As illustrated in FIG. 5, in step S201, the control unit 60 causes a buffer solution to be sucked into the mixing container 30. The control unit 60 controls the channel switch valve 20 to connect the buffer solution port Ps5 to the main port Pm. Further, the control unit 60 controls the syringe pump 10 to draw the buffer solution from the buffer solution pipe Ls5 to the mixing container 30. Accordingly, a predetermined amount of the buffer solution is retained in the mixing container 30.

In step S202, the control unit 60 causes a coloring reagent solution to be sucked into the mixing container 30. The control unit 60 controls the channel switch valve 20 to connect the coloring reagent port Ps4 to the main port Pm. Further, the control unit 60 controls the syringe pump 10 to draw the coloring reagent solution from the coloring reagent pipe Ls4 to the mixing container 30. Accordingly, a predetermined amount of the coloring reagent solution is retained in the mixing container 30.

In step S203, the control unit 60 causes a reaction reagent solution to be sucked into the mixing container 30. The control unit 60 controls the channel switch valve 20 to connect the reaction reagent port Ps1 to the main port Pm. Further, the control unit 60 controls the syringe pump 10 to draw the reaction reagent solution from the reaction reagent pipe Ls3 to the mixing container 30. Accordingly, a predetermined amount of the reaction reagent solution is retained in the mixing container 30.

In step S204, the control unit 60 causes the diluted sample solution to be sucked into the mixing container 30. The control unit 60 controls the channel switch valve 20 to connect the first dilution port Ps9 or the second dilution port Ps10 to the main port Pm. Further, the control unit 60 controls the syringe pump 10 to draw the diluted solution from the first dilution pipe Ls9 or the second dilution pipe Ls10 to the mixing container 30. Accordingly, a predetermined amount of the diluted solution is retained in the mixing container 30.

In step S205, the control unit 60 causes the reaction reagent solution to be sucked into the mixing container 30. Since the operation of step S205 is the same as the operation of step S203, the description thereof will be omitted.

In step S206, the control unit 60 causes the coloring reagent solution to be sucked into the mixing container 30. Since the operation of step S206 is the same as the operation of step S202, the description thereof will be omitted.

In step S207, the control unit 60 causes the buffer solution to be sucked into the mixing container 30. Since the operation of step S207 is the same as the operation of step S201, the description thereof will be omitted.

The reason why the same operation as that in step S203 is performed in step S205, the same operation as that in step S202 is performed in step S206, and the same operation as that in step S201 is performed in step S207 is to arrange reaction reagent solutions on both sides of the sample solution, further arrange coloring reagent solutions on both sides of the reaction reagent solutions, and further arrange buffer solutions on both sides of the coloring reagent solutions. Inside the mixing container 30, the buffer solution, the coloring reagent solution, the reaction reagent solution, the sample solution, the reaction reagent solution, the coloring reagent solution, and the buffer solution are arranged in this order from the side closer to the syringe pump 10.

In step S208, the control unit 60 delivers the mixture solution of the sample solution, the reaction reagent solutions, the coloring reagent solutions, and the buffer solutions retained in the mixing container 30 to the detection unit 40. The control unit 60 controls the channel switch valve 20 to connect the detection port Ps2 to the main port Pm. Further, the control unit 60 controls the syringe pump 10 to supply the mixture solution from the mixing container 30 to the detection unit 40 via the detection pipe Ls2. Accordingly, the mixture solution retained in the mixing container 30 is delivered to the detection unit 40.

While the reaction reagent solutions, the coloring reagent solutions, and the buffer solutions are retained with a concentration distribution with respect to the sample solution when being retained inside the mixing container 30, the sample solution, the reaction reagent solutions, the coloring reagent solutions, and the buffer solutions are well mixed in a process of being delivered from the mixing container 30 and reaching the detection unit 40 via the channel switch valve 20. Accordingly, the mixing step of step S103 ends.

In step S104, the control unit 60 detects the concentration of aluminum ions contained in the sample solution in the mixture solution (detection step). The control unit 60 controls the detection unit 40 to irradiate the mixture solution with light of a predetermined wavelength and measure a first amount of light transmitting in the light irradiation when the mixture solution delivered from the mixing container 30 passes through the detection unit 40 in step S208.

Next, the control unit 60 controls the channel switch valve 20 to connect the reference port Ps11 to the main port Pm. Further, the control unit 60 controls the syringe pump 10 to draw the reference solution from the reference pipe Ls11 to the mixing container 30. Accordingly, a predetermined amount of the reference solution is retained in the mixing container 30.

Next, the control unit 60 causes the reference solution retained in the mixing container 30 to be delivered to the detection unit 40. The control unit 60 controls the channel switch valve 20 to connect the detection port Ps2 to the main port Pm. Further, the control unit 60 controls the syringe pump 10 to supply the reference solution from the mixing container 30 to the detection unit 40 via the detection pipe Ls2. Accordingly, the reference solution retained in the mixing container 30 is delivered to the detection unit 40.

Next, the control unit 60 controls the detection unit 40 to irradiate the reference solution with light of a predetermined wavelength and measure a second amount of light transmitting in the light irradiation when the reference solution delivered from the mixing container 30 passes through the detection unit 40. The detection unit 40 detects the concentration of aluminum ions contained in the sample solution in the mixture solution based on the first amount of light measured from the mixture solution and the second amount of light measured from the reference solution.

The detection unit 40 detects the aluminum ion concentration by calculating the ratio of the first amount of light to the second amount of light measured from the reference solution whose aluminum ion concentration is known. The aluminum ion concentration detected by the detection unit 40 is transferred to the control unit 60.

The control unit 60 displays a detection result from the detection unit 40 on a display device (not illustrated) or notifies a predetermined notification target of the detection result via the communication unit 65. For example, if the aluminum ion concentration detected by the detection unit 40 exceeds a predefined setting value, the control unit 60 warns the worker via the display screen or the like.

The control unit 60 can set the frequency of the sample analysis treatment illustrated in FIG. 4 to any frequency. For example, the control unit 60 can calculate the increase rate of the aluminum ion concentration per unit time from the aluminum ion concentration detected in the previous sample analysis treatment to the aluminum ion concentration detected in the current sample analysis treatment and set the frequency of the sample analysis treatment such that the interval to the next sample analysis treatment is shorter when the increase rate is higher. This is because, when the increase rate of the aluminum ion concentration is high and if the interval of the sample analysis treatment is not reduced, it may not be possible to detect at a suitable timing that the aluminum ion concentration exceeds the predefined setting value.

The effects and advantages achieved by the sample analysis apparatus of the present embodiment described above will be described.

According to the sample analysis apparatus 100 of the present embodiment, the syringe pump 10 and the channel switch valve 20 are controlled to connect the reaction reagent port Ps3, which is connected to the reaction reagent pipe Ls3, to the main port Pm, which is connected to the main pipe Lm on which the syringe pump 10 is arranged, to draw a reaction reagent solution from the reaction reagent pipe Ls3 to the mixing container 30, connect the sample port Ps1 to the main port Pm to draw a sample solution from the sample pipe Ls1 to the mixing container 30, and re-connect the reaction reagent port Ps3 to the main port Pm to draw the reaction reagent solution from the reaction reagent pipe Ls3 to the mixing container 30. Accordingly, a mixture solution of the sample solution and the reaction reagent solutions are retained in the mixing container 30 with both sides of the sample solution being interposed between the reaction reagent solutions.

The main port Pm is then connected to the detection port Ps2, and the mixture solution is supplied from the mixing container 30 to the detection unit 40. The mixture solution is guided from the main pipe Lm to the main port Pm, guided from the main port Pm to the detection port Ps2, and guided from the detection port Ps2 to the detection unit 40 via the detection pipe Ls2. Since the mixture solution is retained in the mixing container 30 with both sides of the sample solution being interposed between the reaction reagent solutions, the sample solution and the reaction reagent solutions are suitably mixed with each other when the mixture solution is guided from the mixing container 30 to the detection unit 40.

As described above, according to the sample analysis apparatus 100 of the present embodiment, since the sample solution and the reaction reagent solution are automatically mixed with each other without requiring an operation performed by a worker, it is not required to secure a worker who performs operations or a space for the operations of mixing the reaction reagent solution to the sample solution extracted from the treatment solution used for surface treatment of a metal material. Further, since the sample solution and the reaction reagent solution are suitably mixed with each other, this makes it possible to provide the sample analysis apparatus 100 that enables suitable analysis so that the concentration of a specified substance contained in a treatment solution is maintained within a desired range.

Further, according to the sample analysis apparatus 100 of the present embodiment, a reference solution containing a predetermined concentration of aluminum ions is prepared, the first amount of light transmitting when the mixture solution is irradiated with light of a particular wavelength and the second amount of light transmitting when the reference solution is irradiated with light of the particular wavelength are measured, and the aluminum ion concentration can be accurately detected based on the first amount of light and the second amount of light.

Further, according to the sample analysis apparatus 100 of the present embodiment, a sample solution and pure water are drawn to the mixing container 30, the main port Pm is connected to the first dilution port Ps9 to supply a diluted solution from the mixing container 30 to the first diluting container Co9, and thereby the sample solution can be suitably diluted and retained in the first diluting container Co9.

Further, according to the sample analysis apparatus 100 of the present embodiment, since a sample solution is supplied to the removal unit 70 and thereby chromate ions are suitably removed from the sample solution, the concentration of aluminum ions contained in the sample solution can be accurately detected at the detection unit 40.

The sample analysis apparatus of the present embodiment described above is understood as follows, for example.

A sample analysis apparatus (100) according to one aspect of the present disclosure includes: a pump (10) arranged on a main pipe (Lm); a channel switch unit (20) having a main port (Pm) connected to the main pipe and a plurality of sub-ports (Ps) and configured to select one of the sub-ports that is connected to the main port; a mixing container (30) provided on the main pipe between the pump and the main port; a detection unit (40) configured to detect a concentration of a specified substance contained in a sample solution extracted from a treatment solution used for surface treatment of a metal material; and a control unit (60) configured to control the pump and the channel switch unit. The plurality of sub-ports include a sample port (Ps1) connected to a sample pipe (Ls1) supplied with the sample solution, a reagent port (Ps4) connected to a reagent pipe (Ls4) supplied with a reagent solution, and a detection port (Ps2) connected to a detection pipe (Ls2) on which the detection unit is arranged. The control unit is configured to control the pump and the channel switch unit so as to connect the reagent port to the main port to draw the reagent solution from the reagent pipe to the mixing container, connect the sample port to the main port to draw the sample solution from the sample pipe to the mixing container, re-connect the reagent port to the main port to draw the reagent solution from the reagent pipe to the mixing container, and connect the detection port to the main port to supply a mixture solution containing the sample solution and the reagent solution from the mixing container to the detection unit.

According to the sample analysis apparatus of one aspect of the present disclosure, the pump and the channel switch unit are controlled to connect the reagent port, which is connected to the reaction reagent pipe, to the main port, which is connected to the main pipe on which the pump is arranged, to draw a reagent solution from the reagent pipe to the mixing container, connect the sample port to the main port to draw a sample solution from the sample pipe to the mixing container, and re-connect the reagent port to the main port to draw the reagent solution from the reagent pipe to the mixing container. Accordingly, a mixture solution of the sample solution and the reagent solutions are retained in the mixing container with both sides of the sample solution being interposed between the reagent solutions.

The main port is then connected to the detection port, and the mixture solution is supplied from the mixing container to the detection unit. The mixture solution is guided from the main pipe to the main port, guided from the main port to the detection port, and guided from the detection port to the detection unit via the detection pipe. Since the mixture solution is retained in the mixing container with both sides of the sample solution being interposed between the reagent solutions, the sample solution and the reagent solution are suitably mixed with each other when the mixture solution is guided from the mixing container to the detection unit.

As described above, according to the sample analysis apparatus of one aspect of the present disclosure, since the sample solution and the reagent solution are automatically mixed with each other without requiring an operation performed by a worker, it is not required to secure a worker who performs operations or a space for the operations of mixing the reagent solution to the sample solution extracted from the treatment solution used for surface treatment of a metal material. Further, since the sample solution and the reagent solution are suitably mixed with each other, this makes it possible to provide the sample analysis apparatus that enables suitable analysis so that the concentration of a specified substance contained in a treatment solution is maintained within a desired range.

In the sample analysis apparatus of one aspect of the present disclosure, the plurality of sub-ports may include a reference port (Ps11) connected to a reference pipe (Ls11) supplied with a reference solution containing a predetermined concentration of the specified substance. The control unit may control the pump and the channel switch unit so as to connect the reference port to the main port to draw the reference solution from the reference pipe to the mixing container and connect the detection port to the main port to supply the reference solution from the mixing container to the detection unit. The detection unit may measure a first amount of light transmitting when irradiating the mixture solution with a particular wavelength of light, measure a second amount of light transmitting when irradiating the reference solution with the particular wavelength of light, and detect a concentration of the specified substance based on the first amount of light and the second amount of light.

According to the sample analysis apparatus of the present configuration, a reference solution containing a predetermined concentration of a specified substance is prepared, the first amount of light transmitting when the mixture solution is irradiated with light of a particular wavelength and the second amount of light transmitting when the reference solution is irradiated with light of the particular wavelength are measured, and the specified substance concentration can be accurately detected based on the first amount of light and the second amount of light.

In the sample analysis apparatus of one aspect of the present disclosure, the plurality of sub-ports may include a pure water port (Ps12) connected to a pure water pipe (Ls12) supplied with pure water and a dilution port (Ps9) connected to a diluting container (Co9) retaining a diluted solution in which the sample solution and the pure water are mixed. The control unit may control the pump and the channel switch unit so as to connect the sample port to the main port to draw the sample solution from the sample pipe to the mixing container, connect the pure water port to the main port to draw the pure water from the pure water pipe to the mixing container, and connect the dilution port to the main port to supply the diluted solution from the mixing container to the diluting container.

According to the sample analysis apparatus of the present configuration, a sample solution and pure water are drawn to the mixing container, the main port is connected to the dilution port to supply a diluted solution from the mixing container to the diluting container, and thereby the sample solution can be suitably diluted and retained in the diluting container.

In the sample analysis apparatus of one aspect of the present disclosure, the plurality of sub-ports may include a removal port (Ps8) connected to a removal pipe (Ls8) provided with a removal unit (70) used for removing a removal target substance contained in the sample solution. The control unit may control the pump and the channel switch unit so as to connect the sample port to the main port to draw the sample solution from the sample pipe to the mixing container and connect the removal port to the main port to supply the sample solution from the mixing container to the removal unit.

According to the sample analysis apparatus of the present configuration, since a sample solution is supplied to the removal unit and thereby a removal target substance is suitably removed from the sample solution, the concentration of a specified substance contained in the sample solution can be accurately detected at the detection unit.

The sample analysis method of the present embodiment described above is understood as follows, for example.

A sample analysis method according to one aspect of the present disclosure is a sample analysis method of using a sample analysis apparatus to detect a concentration of a specified substance contained in a sample. The sample analysis apparatus includes a pump connected to a main pipe, a channel switch unit having a main port connected to the main pipe and a plurality of sub-ports and configured to select one of the sub-ports that is connected to the main port, a mixing container provided on the main pipe between the pump and the main port, and a detection unit configured to detect a concentration of the specified substance contained in a sample solution extracted from a treatment solution used for surface treatment of a metal material. The plurality of sub-ports include a sample port connected to a sample pipe supplied with the sample solution, a reagent port connected to a reagent pipe supplied with a reagent solution, and a detection port connected to a detection pipe on which the detection unit is arranged. The sample analysis method includes: a control step of controlling the pump and the channel switch unit so as to connect the reagent port to the main port to draw the reagent solution from the reagent pipe to the mixing container, connect the sample port to the main port to draw the sample solution from the sample pipe to the mixing container, re-connect the reagent port to the main port to draw the reagent solution from the reagent pipe to the mixing container, and connect the detection port to the main port to supply a mixture solution containing the sample solution and the reagent solution from the mixing container to the detection unit; and a detection step of determining a concentration of the specified substance contained in the mixture solution by using the detection unit.

According to the sample analysis method of one aspect of the present disclosure, the pump and the channel switch unit are controlled to connect the reagent port, which is connected to the reagent pipe, to the main port, which is connected to the main pipe on which the pump is arranged, to draw a reagent solution from the reagent pipe to the mixing container, connect the sample port to the main port to draw a sample solution from the sample pipe to the mixing container, and re-connect the reagent port to the main port to draw the reagent solution from the reagent pipe to the mixing container. Accordingly, a mixture solution of the sample solution and the reagent solutions are retained in the mixing container with both sides of the sample solution being interposed between the reagent solutions.

The main port is then connected to the detection port, and the mixture solution is supplied from the mixing container to the detection unit. The mixture solution is guided from the main pipe to the main port, guided from the main port to the detection port, and guided from the detection port to the detection unit via the detection pipe. Since the mixture solution is retained in the mixing container with both sides of the sample solution being interposed between the reagent solutions, the sample solution and the reagent solution are suitably mixed with each other when the mixture solution is guided from the mixing container to the detection unit.

As described above, according to the sample analysis method of one aspect of the present disclosure, since the sample solution and the reagent solution are automatically mixed with each other without requiring an operation performed by a worker, it is not required to secure a worker who performs operations or a space for the operations of mixing the reagent solution to the sample solution extracted from the treatment solution used for surface treatment of a metal material. Further, since the sample solution and the reagent solution are suitably mixed with each other, this makes it possible to provide the sample analysis method that enables suitable analysis so that the concentration of a specified substance contained in a treatment solution is maintained within a desired range.

In the sample analysis method of one aspect of the present disclosure, the plurality of sub-ports may include a reference port connected to a reference pipe supplied with a reference solution containing a predetermined concentration of the specified substance, the control step may control the pump and the channel switch unit so as to connect the reference port to the main port to draw the reference solution from the reference pipe to the mixing container and connect the detection port to the main port to supply the reference solution from the mixing container to the detection unit. The detection step may measure a first amount of light transmitting when irradiating the mixture solution with a particular wavelength of light, measure a second amount of light transmitting when irradiating the reference solution with the particular wavelength of light, and detect a concentration of the specified substance based on the first amount of light and the second amount of light.

According to the sample analysis method of the present configuration, a reference solution containing a predetermined concentration of a specified substance is prepared, the first amount of light transmitting when the mixture solution is irradiated with light of a particular wavelength and the second amount of light transmitting when the reference solution is irradiated with light of the particular wavelength are measured, and the specified substance concentration can be accurately detected based on the first amount of light and the second amount of light.

In the sample analysis method of one aspect of the present disclosure, the plurality of sub-ports may include a pure water port connected to a pure water pipe supplied with pure water and a dilution port connected to a diluting container retaining a diluted solution in which the sample solution and the pure water are mixed. The control step may control the pump and the channel switch unit so as to connect the sample port to the main port to draw the sample solution from the sample pipe to the mixing container, connect the pure water port to the main port to draw the pure water from the pure water pipe to the mixing container, and connect the dilution port to the main port to supply the diluted solution from the mixing container to the diluting container.

According to the sample analysis method of the present configuration, a sample solution and pure water are drawn to the mixing container, the main port is connected to the dilution port to supply a diluted solution from the mixing container to the diluting container, and thereby the sample solution can be suitably diluted and retained in the diluting container.

In the sample analysis method of one aspect of the present disclosure, the plurality of sub-ports may include a removal port connected to a removal pipe provided with a removal unit used for removing a removal target substance contained in the sample solution. The control step may control the pump and the channel switch unit so as to connect the sample port to the main port to draw the sample solution from the sample pipe to the mixing container and connect the removal port to the main port to supply the sample solution from the mixing container to the removal unit.

According to the sample analysis method of the present configuration, since a sample solution is supplied to the removal unit and thereby a removal target substance is suitably removed from the sample solution, the concentration of a specified substance contained in the sample solution can be accurately detected at the detection unit.

What is claimed is:

1. A sample analysis apparatus comprising:

a pump arranged on a main pipe;

a channel switch unit having a main port connected to the main pipe and a plurality of sub-ports and configured to select one of the sub-ports that is connected to the main port;

a mixing container provided on the main pipe between the pump and the main port;

a detection unit configured to detect a concentration of a specified substance contained in a sample solution extracted from a treatment solution used for surface treatment of a metal material; and a control unit configured to control the pump and the channel switch unit, wherein the plurality of sub-ports include a sample port connected to a sample pipe supplied with the sample solution, a reagent port connected to a reagent pipe supplied with a reagent solution, and a detection port connected to a detection pipe on which the detection unit is arranged, and wherein the control unit is configured to control the pump and the channel switch unit so as to connect the reagent port to the main port to draw the reagent solution from the reagent pipe to the mixing container, connect the sample port to the main port to draw the sample solution from the sample pipe to the mixing container, re-connect the reagent port to the main port to draw the reagent solution from the reagent pipe to the mixing container, and connect the detection port to the main port to supply a mixture solution containing the sample solution and the reagent solution from the mixing container to the detection unit.

2. The sample analysis apparatus according to claim 1, wherein the plurality of sub-ports include a reference port connected to a reference pipe supplied with a reference solution containing a predetermined concentration of the specified substance, wherein the control unit controls the pump and the channel switch unit so as to connect the reference port to the main port to draw the reference solution from the reference pipe to the mixing container and connect the detection port to the main port to supply the reference solution from the mixing container to the detection unit, and wherein the detection unit measures a first amount of light transmitting when irradiating the mixture solution with a particular wavelength of light, measures a second amount of light transmitting when irradiating the reference solution with the particular wavelength of light, and detects a concentration of the specified substance based on the first amount of light and the second amount of light.

3. The sample analysis apparatus according to claim 1, wherein the plurality of sub-ports include a pure water port connected to a pure water pipe supplied with pure water and a dilution port connected to a diluting container retaining a diluted solution in which the sample solution and the pure water are mixed, and wherein the control unit controls the pump and the channel switch unit so as to connect the sample port to the main port to draw the sample solution from the sample pipe to the mixing container, connect the pure water port to the main port to draw the pure water from the pure water pipe to the mixing container, and connect the dilution port to the main port to supply the diluted solution from the mixing container to the diluting container.

4. The sample analysis apparatus according to claim 1, wherein the plurality of sub-ports include a removal port connected to a removal pipe provided with a removal unit used for removing a removal target substance contained in the sample solution, and wherein the control unit controls the pump and the channel switch unit so as to connect the sample port to the main port to draw the sample solution from the sample pipe to the mixing container and connect the removal port to the main port to supply the sample solution from the mixing container to the removal unit.

5. A sample analysis method of using a sample analysis apparatus to determine a concentration of a specified substance contained in a sample solution, wherein the sample analysis apparatus comprises a pump arranged on a main pipe, a channel switch unit having a main port connected to the main pipe and a plurality of sub-ports and configured to select one of the sub-ports that is connected to the main port, a mixing container provided on the main pipe between the pump and the main port, and a detection unit configured to detect a concentration of the specified substance contained in a sample solution extracted from a treatment solution used for surface treatment of a metal material, wherein the plurality of sub-ports include a sample port connected to a sample pipe supplied with the sample solution, a reagent port connected to a reagent pipe supplied with a reagent solution, and a detection port connected to a detection pipe on which the detection unit is arranged, the sample analysis method comprising:

a control step of controlling the pump and the channel switch unit so as to connect the reagent port to the main port to draw the reagent solution from the reagent pipe to the mixing container, connect the sample port to the main port to draw the sample solution from the sample pipe to the mixing container, re-connect the reagent port to the main port to draw the reagent solution from the reagent pipe to the mixing container, and connect the detection port to the main port to supply a mixture solution containing the sample solution and the reagent solution from the mixing container to the detection unit; and a detection step of determining a concentration of the specified substance contained in the mixture solution by using the detection unit.

6. The sample analysis method according to claim 5, wherein the plurality of sub-ports include a reference port connected to a reference pipe supplied with a reference solution containing a predetermined concentration of the specified substance, wherein the control step controls the pump and the channel switch unit so as to connect the reference port to the main port to draw the reference solution from the reference pipe to the mixing container and connect the detection port to the main port to supply the reference solution from the mixing container to the detection unit, and wherein the detection step measures a first amount of light transmitting when irradiating the mixture solution with a particular wavelength of light, measures a second amount of light transmitting when irradiating the reference solution with the particular wavelength of light, and detects a concentration of the specified substance based on the first amount of light and the second amount of light.

7. The sample analysis method according to claim 5, wherein the plurality of sub-ports include a pure water port connected to a pure water pipe supplied with pure water and a dilution port connected to a diluting container retaining a diluted solution in which the sample solution and the pure water are mixed, and wherein the control step controls the pump and the channel switch unit so as to connect the sample port to the main port to draw the sample solution from the sample pipe to the mixing container, connect the pure water port to the main port to draw the pure water from the pure water pipe to the mixing container, and connect the dilution port to the main port to supply the diluted solution from the mixing container to the diluting container.

8. The sample analysis method according to claim 5, wherein the plurality of sub-ports include a removal port connected to a removal pipe provided with a removal unit used for removing a removal target substance contained in the sample solution, and wherein the control step controls the pump and the channel switch unit so as to connect the sample port to the main port to draw the sample solution from the sample pipe to the mixing container and connect the removal port to the main port to supply the sample solution from the mixing container to the removal unit.

* * * * *